(12) United States Patent
Fischer

(10) Patent No.: US 6,982,651 B2
(45) Date of Patent: Jan. 3, 2006

(54) AUTOMATIC METER READING MODULE

(75) Inventor: Jeffrey L. Fischer, Dubois, PA (US)

(73) Assignee: M & FC Holding, LLC, Raleigh, NC (US)

( * ) Notice: Subject to any disclaimer, the term of this patent is extended or adjusted under 35 U.S.C. 154(b) by 569 days.

(21) Appl. No.: 10/136,403

(22) Filed: May 2, 2002

(65) Prior Publication Data

US 2002/0163442 A1 Nov. 7, 2002

Related U.S. Application Data

(60) Provisional application No. 60/288,056, filed on May 2, 2001.

(51) Int. Cl.
*G08B 23/00* (2006.01)

(52) U.S. Cl. ............................. 340/870.02; 340/870.03; 340/870.32; 324/142

(58) Field of Classification Search ............ 340/870.02, 340/870.03, 870.32; 324/142
See application file for complete search history.

(56) References Cited

U.S. PATENT DOCUMENTS

| | | | | |
|---|---|---|---|---|
| 4,614,945 A | * | 9/1986 | Brunius et al. | 340/870.03 |
| 4,638,314 A | | 1/1987 | Keller | |
| 4,642,634 A | * | 2/1987 | Gerri et al. | 340/870.02 |
| 4,660,035 A | * | 4/1987 | Hoffman | 340/870.02 |
| 4,688,038 A | * | 8/1987 | Giammarese | 340/870.02 |
| 4,728,950 A | * | 3/1988 | Hendrickson et al. | 340/870.31 |
| 4,904,995 A | * | 2/1990 | Bonner et al. | 340/870.02 |
| 4,998,102 A | * | 3/1991 | Wyler et al. | 340/870.02 |
| 5,014,213 A | * | 5/1991 | Edwards et al. | 702/62 |
| 5,880,464 A | * | 3/1999 | Vrionis | 250/230 |
| 5,963,650 A | * | 10/1999 | Simionescu et al. | 705/63 |
| 6,100,816 A | * | 8/2000 | Moore | 340/870.02 |
| 6,275,168 B1 | * | 8/2001 | Slater et al. | 340/870.02 |
| 6,424,270 B1 | * | 7/2002 | Ali | 340/870.02 |

* cited by examiner

*Primary Examiner*—Albert K. Wong
(74) *Attorney, Agent, or Firm*—Andrus, Sceales, Starke & Sawall, LLP

(57) ABSTRACT

An automatic meter reader module is provided that is adapted to be retrofitted or installed in a new or existing utility meter. The module includes a printed circuit board (PCB) on which is mounted on-board circuitry and detection equipment configured to detect utility consumption metered by the utility meter. A transmission device operatively coupled to the PCB is configured to transmit data indicative of utility usage. The PCB is configured to mount within an inner cavity of the utility meter.

19 Claims, 9 Drawing Sheets

AUTOMATIC METER READING MODULE

RELATED APPLICATION

This application claims priority from Provisional Application Ser. No. 60/288,056 filed on May 2, 2001 entitled: "AUTOMATIC METER READING MODULE", the entire disclosure of which is hereby incorporated by reference herein.

FIELD OF THE INVENTION

The present invention relates to an automatic meter reading module, which when retrofitted to or installed in a utility meter, such as a gas meter, will enable the meter to support automated meter reading.

BACKGROUND OF THE INVENTION

Utility companies typically measure consumption using meters and bill their customers accordingly. Traditionally, at the end of a reporting period, a utility employee had physically read and recorded each customer's meter readout dials that reflected usage. The recorded data was eventually re-entered into an accounting system for billing purposes. The process was labor intensive and duplicative. Moreover, unplanned nuisances such as dogs, inclement weather or a customer not being home (for inside meter sets) disrupted the meter reading process.

In recent years, attempts have been made to develop automated meter reading systems that automatically capture consumption data from the field by the way of radio frequency (RF) communication. Although existing meters may be replaced with new meters that provide an automatic meter reading capability, such a replacement is uneconomical due to the large number of meters that need to be updated. Thus, adapter modules have been developed which allow existing meters to be retrofitted for providing the automated data collection capability until the older meters have been completely phased out. The use of adapter modules also enables meter manufacturers to continue their production of standard meters while providing the optional capability of automated meter reading.

Equipment currently available for purposes of automatic meter reading can be quite costly to manufacture due in part to up-front tooling costs for molded plastic and stamped parts. An automatic meter reading adapter module using molded components for the housing is described in U.S. Pat. No. 6,100,816. This adapter comprises a package that includes gears and shafts that engage the drive of the meter. A sensor detects shaft rotation and an electronics package is used for interpreting the sensor output. Communication of meter parameters is then transmitted via RF to a remote location. Some disadvantages of the described adapter lie in the initial tooling costs for the plastic parts that make up the adapter module and the positioning of the adapter module.

In certain prior art systems, the automatic meter reading modules are positioned external to the existing meter or require additional casings. That is, the module either mounts to the external meter casing or mounts directly to the gears and shafts of the existing meter but requires additional casings and parts to expand the meter housing to accommodate the module as well as other components, such as antennas, located externally.

The additional tooling and parts substantially increase total installation cost to a utility, due to the large number of conventional meters still in service. Further, the installation of conventional automatic modules expands the meter housing. In some environments, the position of the meter will not accommodate an expanded housing, therefore, requiring replacement of the entire meter. Further, conventional meters have tamper resistant seals. Any attempt to alter the meter is made evident by the tamper resistant seals. Externally mounting the automatic meter module or expanding the casing for installing the automatic meter module leaves the meter and module in a vulnerable state whereby metered gas usage may be altered. That is, the conventional automatic meter module lessens the effectiveness of the tamper-resistant design. As a result, there is a need for an automatic meter module capable of easily retrofitting conventional meters at low cost, without requiring additional tooling, and maintaining the tamper-resistivity of the conventional meter.

SUMMARY

These and other needs are met by embodiments of the present invention, which provide an automatic meter reader module having an inner cavity of a given volume. The automatic reader meter module includes a printed circuit board (PCB) on which is mounted on-board circuitry and detection equipment configured to detect utility consumption metered by the utility meter. The module also includes a transmission device operatively coupled to the PCB that is configured to transmit data indicative of utility consumption. Further, the PCB is configured to mount entirely within the inner cavity of the utility meter without increasing the given volume of the cavity.

The present invention further provides for a utility meter comprising a meter housing. A mechanical index assembly is configured to mount to the meter housing and to define an inner cavity of a given volume bounded by the meter housing and its mechanical index assembly. Further, an automatic meter reader module is configured to mount entirely within the inner cavity, the module being operatively connected to the mechanical index assembly and configured to detect utility consumption.

The present invention further provides for an automatic utility meter system comprising a plurality of utility meters each having an inner cavity of a given volume. Each of a plurality of automatic meter reader modules is configured to mount within an inner cavity of a respective utility meter. Each module is configured to detect utility consumption and transmit data indicative of utility consumption over a transmission footprint. A central data collection point is positioned within the transmission footprint and is configured to collect transmission data from a respective automatic reader module.

The foregoing and other features, aspects, and advantages of the present invention will become more apparent from the following detailed description of the present invention when taken in conjunction with the accompanying drawings.

DETAILED DESCRIPTION

Figure 1:
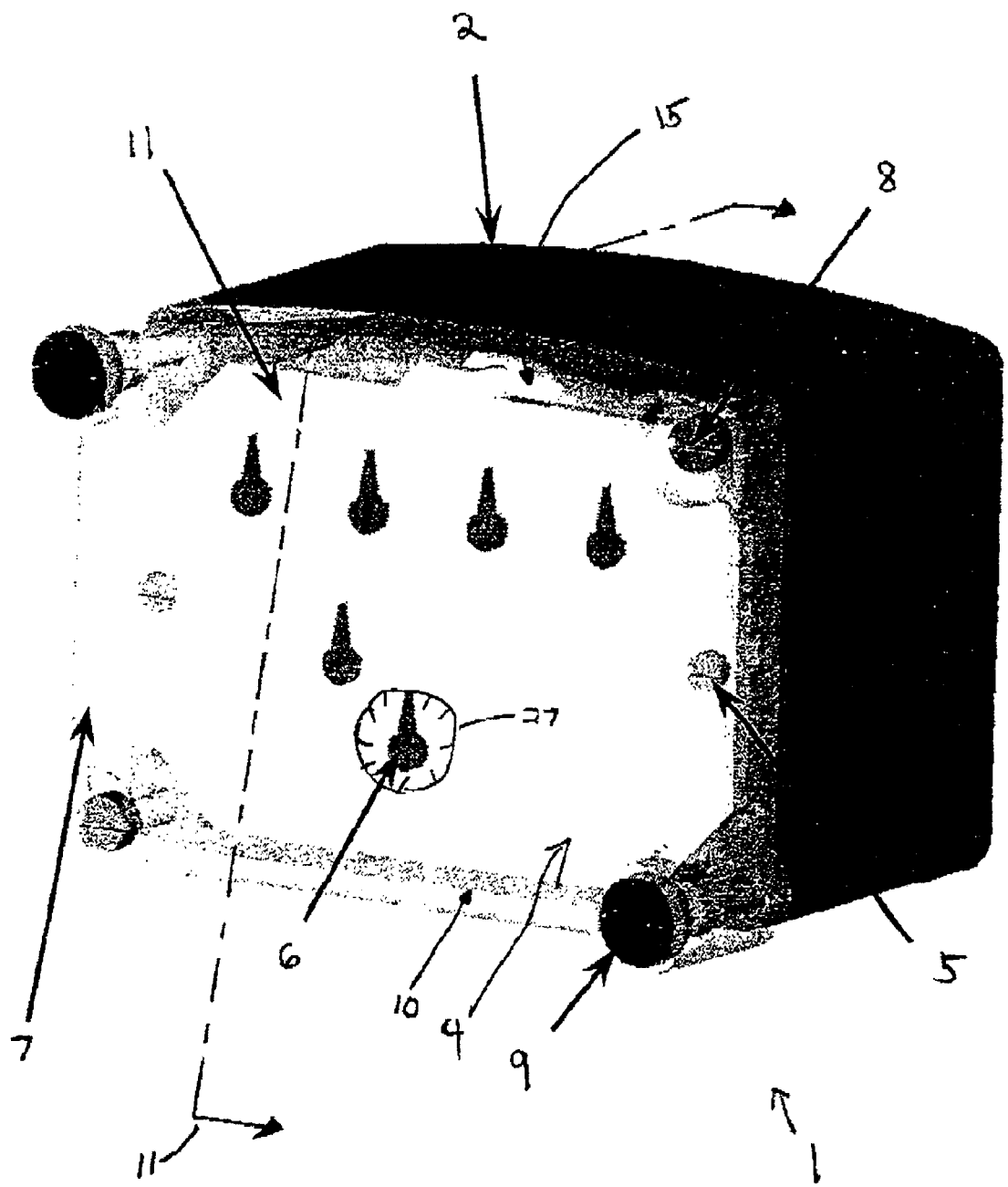
FIG. 1 depicts a prior art utility meter without an automatic meter reading module installed.

FIG. 1 depicts an existing mechanical utility gas meter 1 that contains a mechanical index display 4. The mechanical index 4 includes a display hand 6 each on one or more dials 27 that indicate gas consumption. Mechanical index mounting screws 5 secure the mechanical index 4 to the meter 1, which is protected by a clear index box 7. A gasket 10 arranged between the mechanical index 4 and the clear index box 7 further protects the meter 1 from environmental conditions external to the meter 1. Index box mounting screws 8 secure the clear index box 7 to the meter 1. Tamper evident seals 9 positioned over the head of the index box mounting screw 8 indicates any attempt to remove the clear index box 7. Display hands 6 display gas consumption, which is periodically read and recorded by meter reading personnel and further reported to generate a bill for the consumer. The problematic process of reading a meter 1 is labor intensive, repetitive, costly, and inviting to human error. To benefit the gas utility company, the present invention reduces and even obviates problems attendant with the process of reading a meter 1.

Figure 2:
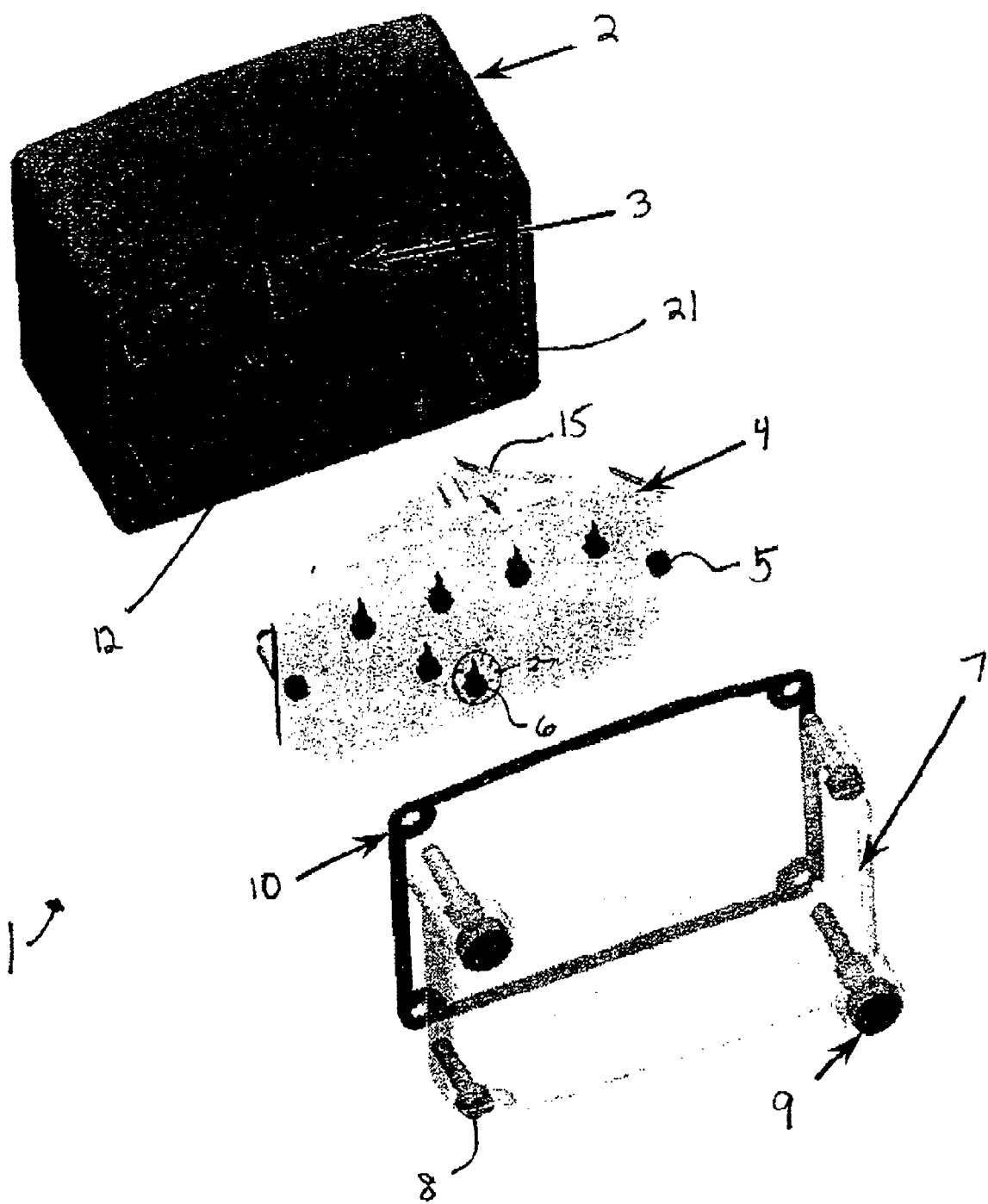
FIG. 2 depicts an assembly of the utility meter illustrated by FIG. 1.

FIG. 2 depicts an assembly drawing of an exemplary existing meter 1 used with the present invention. As discussed in connection with FIG. 1, the meter 1 includes a mechanical index 4, a gasket 10, and a clear index box 7 secured to the meter 1. As shown in the figure, the meter body 2 has an inner cavity 3 in which the mechanical index 4 mounts.

Figure 3:
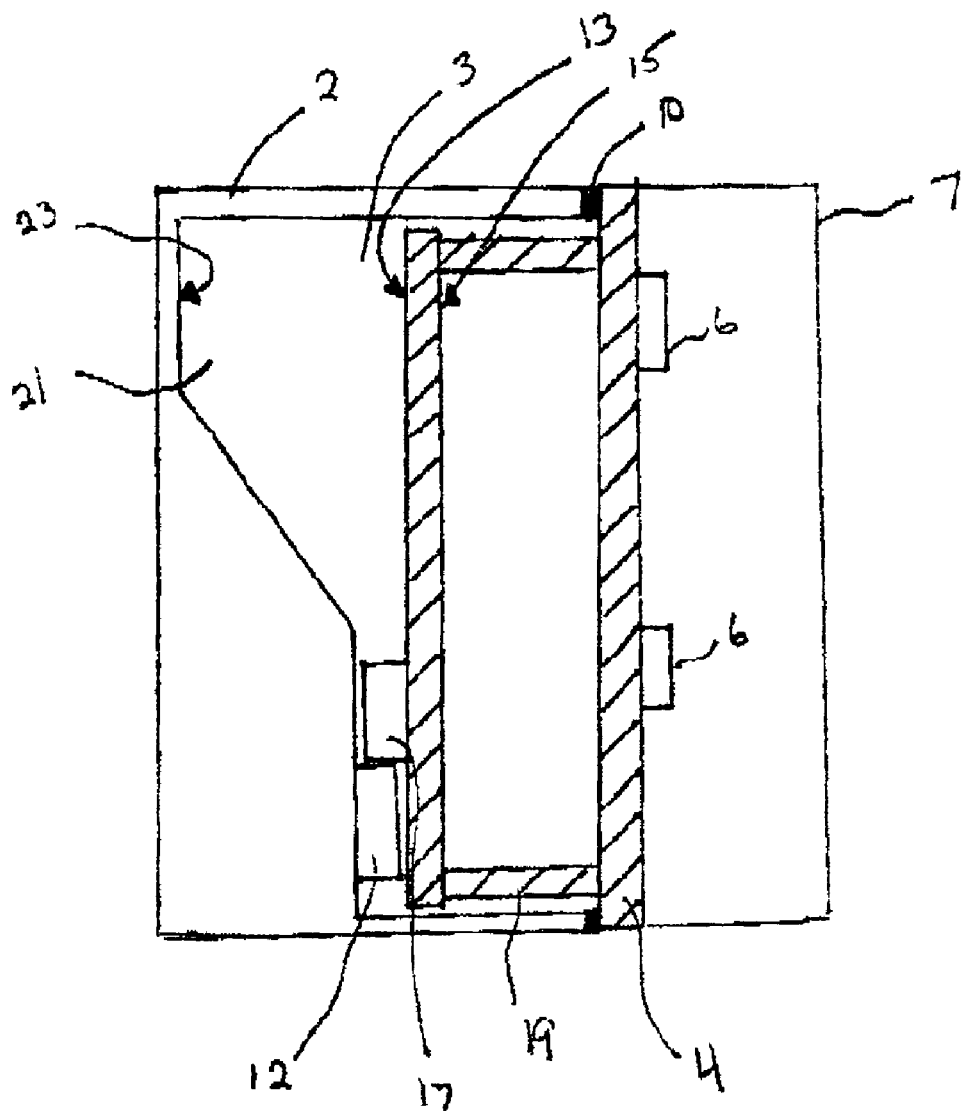
FIG. 3 depicts a cross-sectional view of the utility meter shown in FIG. 1.

FIG. 3 depicts a cross-sectional view of an exemplary existing meter 1 along with the sectional line 11 shown in FIG. 1. As depicted, the mechanical index 4 extends into the cavity 3 of the meter 1 but does not occupy the entire space of the cavity 3 leaving an open space 21 between the back side 13 of the mechanical index 4 and the rear 23 of the cavity 3. When mounted, the mechanical index drive gear 17 operatively connects with the meter output shaft gear 12. Rotation of the meter output shaft gear 12 correlates to the gas consumption, which in turn causes the mechanical index drive gear 17 to rotate. Accordingly, display hands 6 display metered gas consumption.

The automatic meter reading module 14 (hereinafter "module 14") as shown in FIGS. 4–8 does not require a special housing but instead utilizes the current cavity 3 available behind the mechanical index 4 of the existing utility meter 1 to house the module 14. The invention satisfies the need to communicate utility usage by a residence or industry to the supplier of the natural gas without requiring a person to travel to a meter location.

Figure 4:
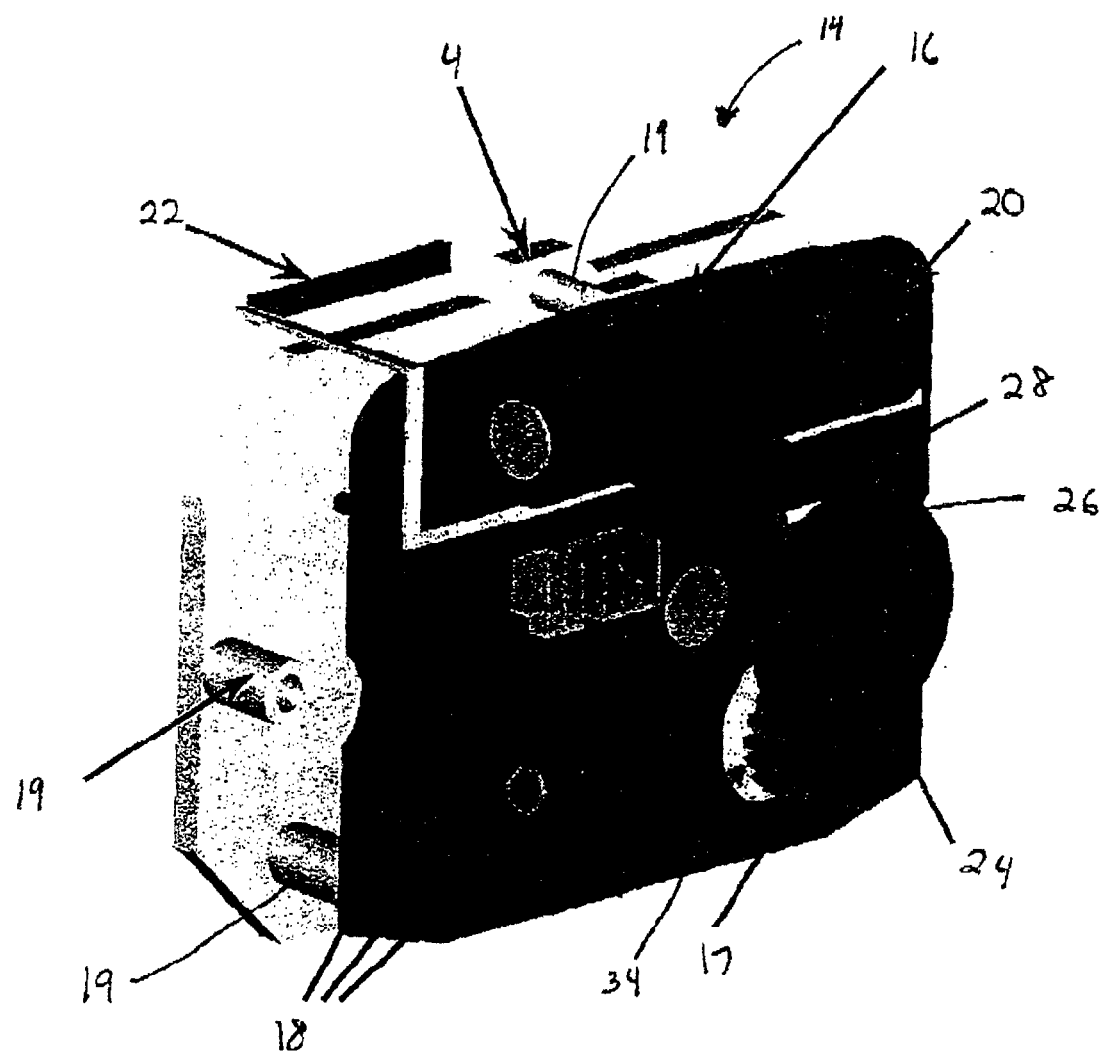
FIG. 4 illustrates an oblique rear view of an automatic meter-reading module secured to a mechanical index of a utility meter in accordance with embodiments of the present invention.

As shown in FIG. 4, the module 14 includes a printed circuit board (PCB) 16 on which a radio, pulse collection and programming circuitry 18 (collectively referred to as "on-board circuitry" 18), a battery 20, antenna 22, and pulse gear 24 for detecting utility usage are connected.

Figure 5:
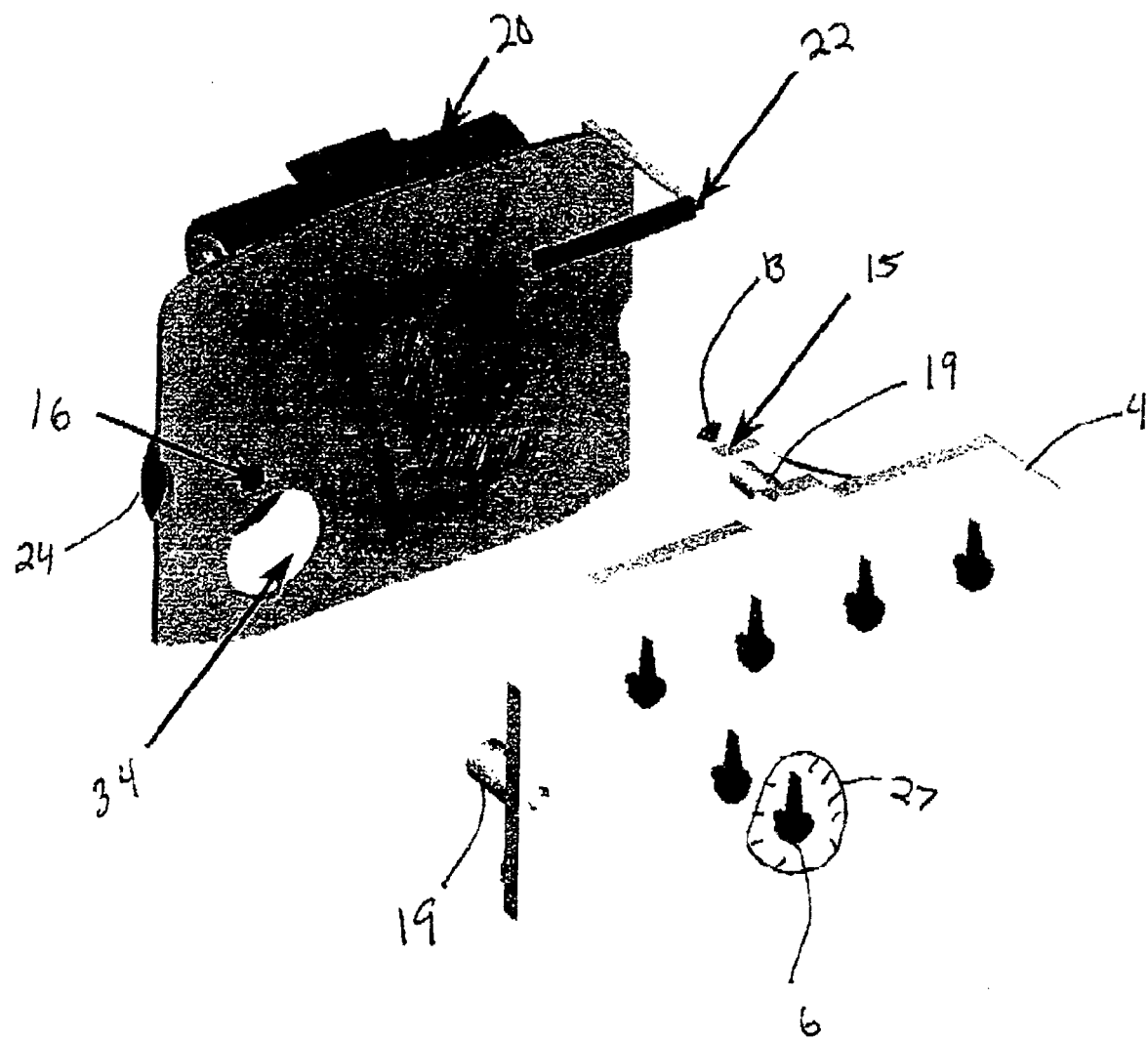
FIG. 5 illustrates an exploded view of the automatic meter reading module and the mechanical index in accordance with embodiments of the present invention.

As shown in FIGS. 4 and 5, the PCB 16 is configured to mount to the rear 13 of the mechanical index 4 on the rear plate 15 (shown in FIG. 5) of the mechanical index 4. The meter body 2 is not depicted in FIGS. 4 and 5. The PCB 16 is secured to the mechanical index 4 by mechanical index mounting bosses 19, fastners, snaps, or by an adhesive tape (latter elements not shown).

As discussed in connection with FIG. 3, a conventional meter 1 has a mechanical index drive gear 17, which drives the dials 6 of the mechanical index 4. The PCB 16 has a hole 34 through which the mechanical index drive gear 17 protrudes and engages a pulse gear 24 that is mounted to the PCB 16. When the module 14 is installed within an existing meter 1, the mechanical index drive gear 17 remains engaged with and is driven by the meter output shaft gear 12, which rotates corresponding to utility consumption. The index drive gear 17 also engages the pulse gear 24, so that rotation of the meter output shaft gear 12 will drive the index drive gear 17, which will, in turn, drive the pulse gear 24.

Referring back to FIG. 4, the principal method of electronic measurement in certain embodiments of the present invention is pulse detection. Pulse gear 24 is fitted with a magnet 26 that rotates with the revolutions of the mechanical index drive gear 17 and creates at least one pulse per rotation. These pulses are counted and processed by the module 14 to give a totaled electronic reading that matches the mechanically driven index 4 reading. In particular, magnet 26 revolutions or pulses are detected by a reed switch 28 mounted to the PCB 16, accumulated by on-board circuitry 18 and transmitted via radio frequency (RF), using the antenna 22, by on-board circuitry 18.

It is within the scope of this invention to use multiple magnets and/or multiple sensors to create more than one pulse per revolution of the drive shaft and to also indicate flow direction. It is also within the scope of this invention to use an alternative sensor such as a Hall effect device, optical sensor and encoder, RF sensor, etc., as are commonly used in other types of flowmeters.

Figure 6:
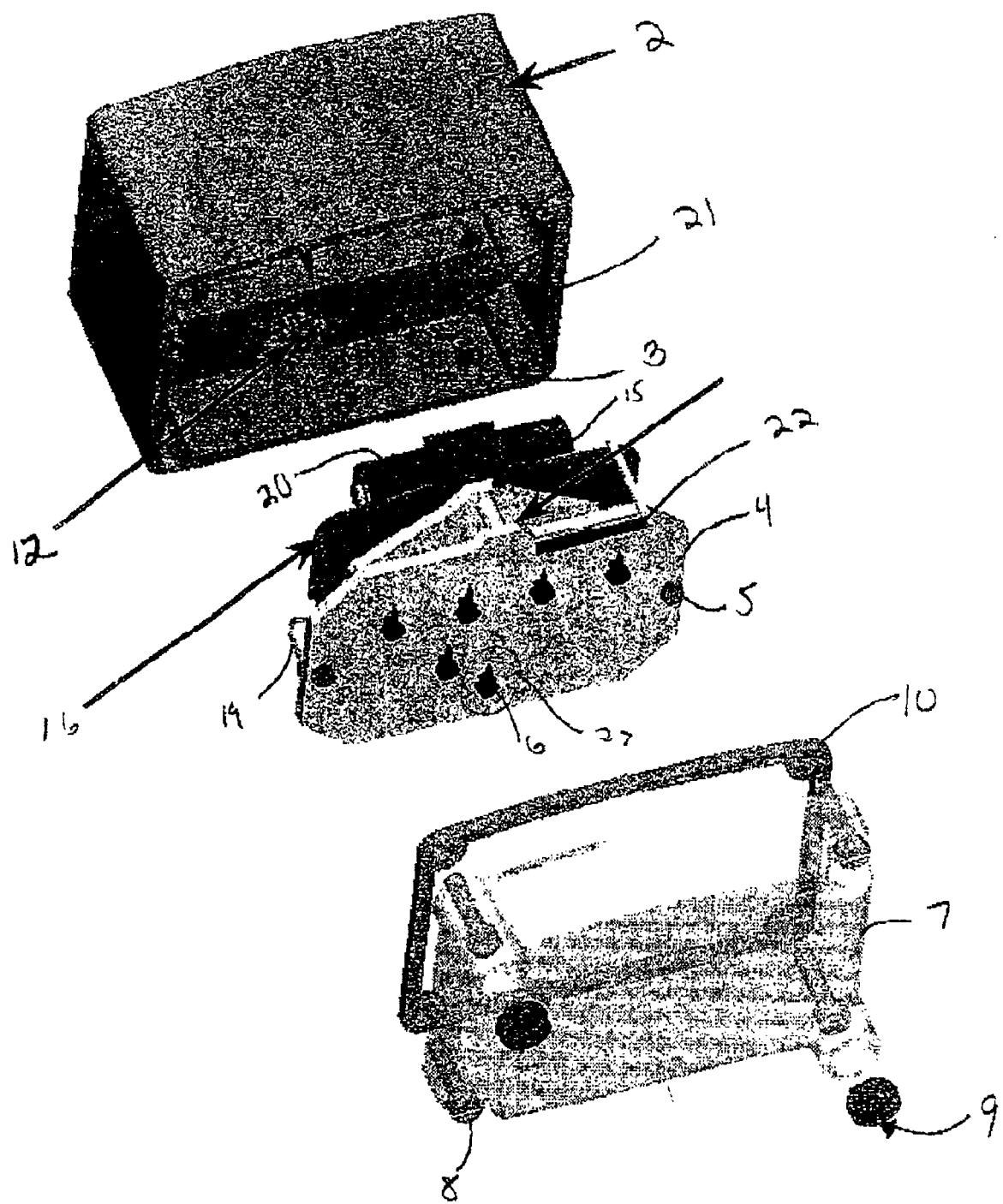
FIG. 6 illustrates an assembly of the utility meter incorporating the automatic meter reading module of the present invention.

As shown in FIG. 6, retrofitting the module 14 to an existing meter typically requires removal of the clear index box 7, removal of the mechanical index 4, attachment of the module 14 to the rear 13 of the mechanical index 4 (as shown in FIGS. 4 and 5), and then, re-installation of the mechanical index 4, module 14, gasket 10, clear index box 7, etc. Depending on the configuration of the meters, an automatic meter reading module 14 may be provided that is adapted to be retrofit (or originally installed, if desired) into more than one meter brand and model.

Figure 7:
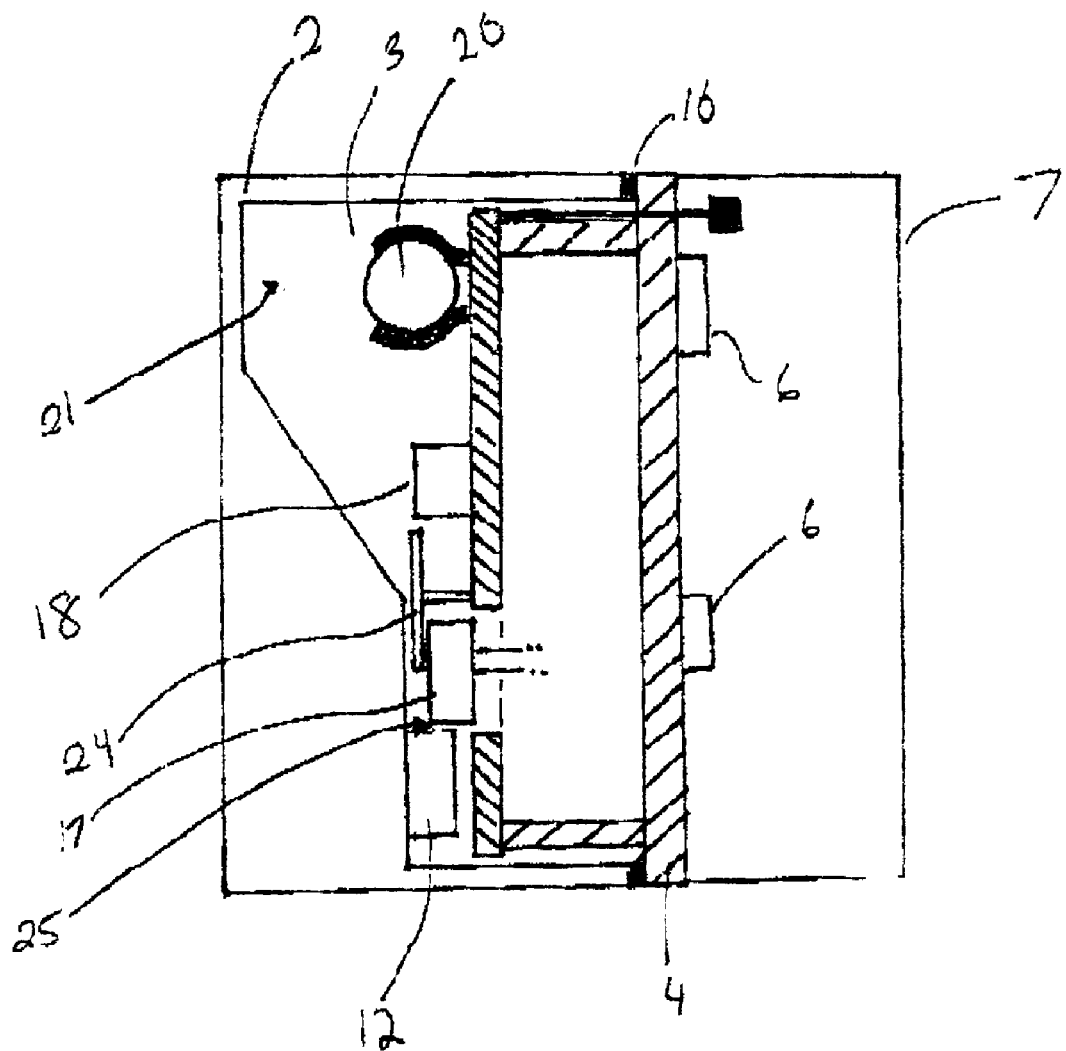
FIG. 7 illustrates a cross-sectional view of the utility meter having an automatic meter reading module installed in accordance with embodiments of the present invention.

FIG. 7 depicts a cross-sectional view of the meter 1 having an installed module 14. The original mechanical interface 25 between the meter output shaft gear 12 and the mechanical index drive gear 17 may or may not need to be extended. This will depend on the meter brand being fitted with the automatic meter reading module 14. A shaft extension adapter (not shown) would be supplied with the module 14 in those instances where it is required. Meters with relatively shallow cavities 3 could, for example, require an extension of the index drive gear 17 if the drive gear 17 no longer engages its mate after installation of the automatic meter reading module 14. Spacers, longer screws and thicker gaskets 10 may also be required for these applications.

As shown, the module 14 is configured to fit within the cavity 3. Depending on the shape of the cavity 3, the on-board circuitry 18 and battery 20 preferably are positioned on the PCB 16 such that when the module 14 is installed, the on-board circuitry 18 and battery 20 are within the open space 21 in the cavity 3. Positioning the module 14 in the cavity 3 of the meter 1 aids in deterring tampering and therefore theft of gas. Further, using the existing meter body 2 without using any casings to enlarge the body 2 keeps tooling and installation costs low and does not require additional measures to protect the module 14 from tampering. The existing body 2 and tamper protections, such as the clear index box 7 and tamper evident seals 9, which have proven effectiveness, provide adequate protection from theft. Further, the retention of the mechanical index 4 allows for visual reading and record management as well as visual confirmation of the data sent by the module 14, if desired.

Figure 8:
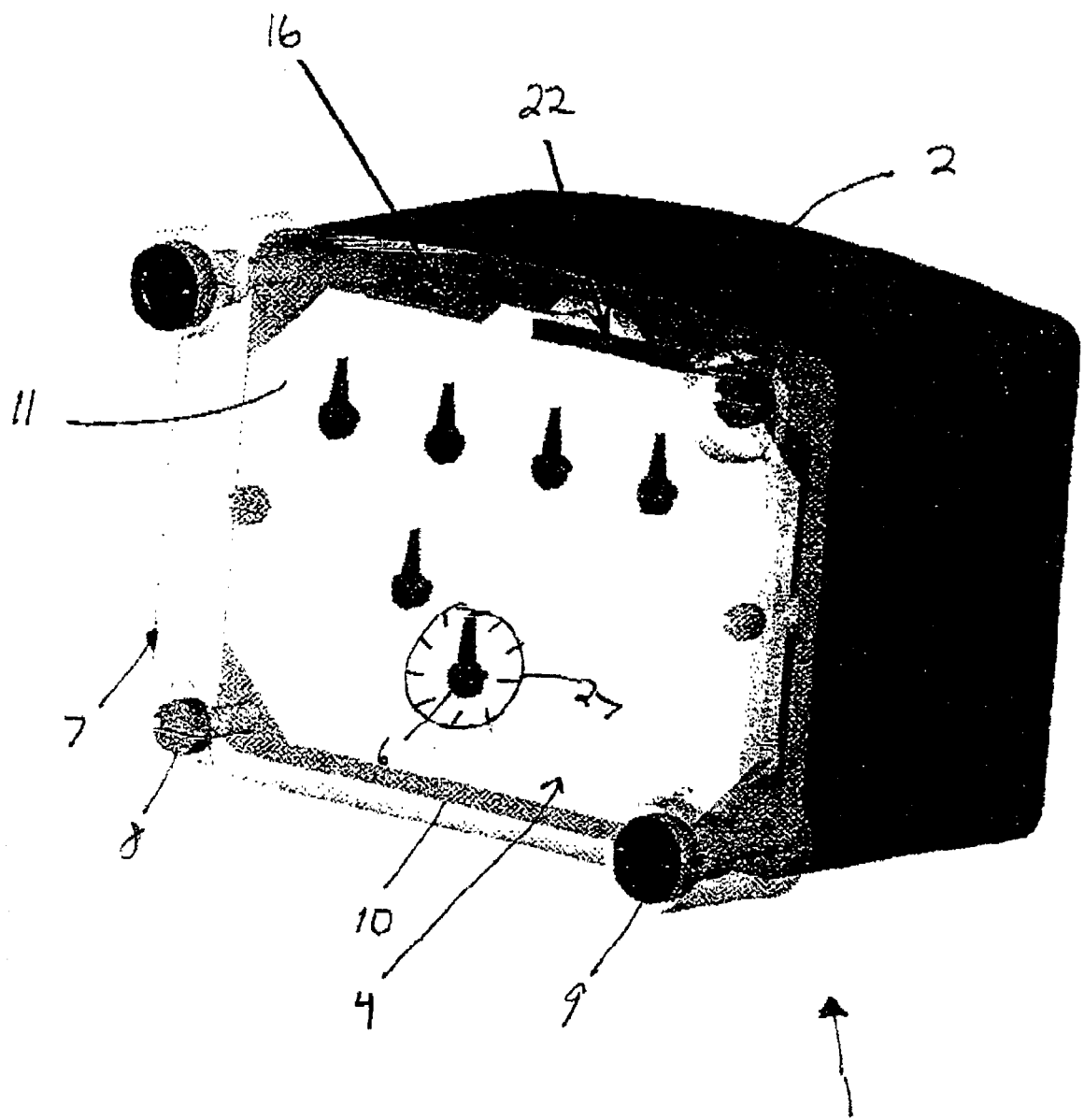
FIG. 8 illustrates the utility meter having an installed automatic meter reading module in accordance with embodiments of the present invention.

Conventionally, antennas are positioned external to the meter 1, thereby exposing the antenna to potential tampering. As shown in FIGS. 7 and 8, the antenna 22 extends from the PCB 16 to the area 36 between the mechanical index 4 and the clear index box 7. This arrangement advantageously protects the antenna 22 from tampering. Further, the antenna 22 may be positioned in the area 36 such that it may transmit a RF signal over a wide angle covering a large footprint 38.

Figure 9:
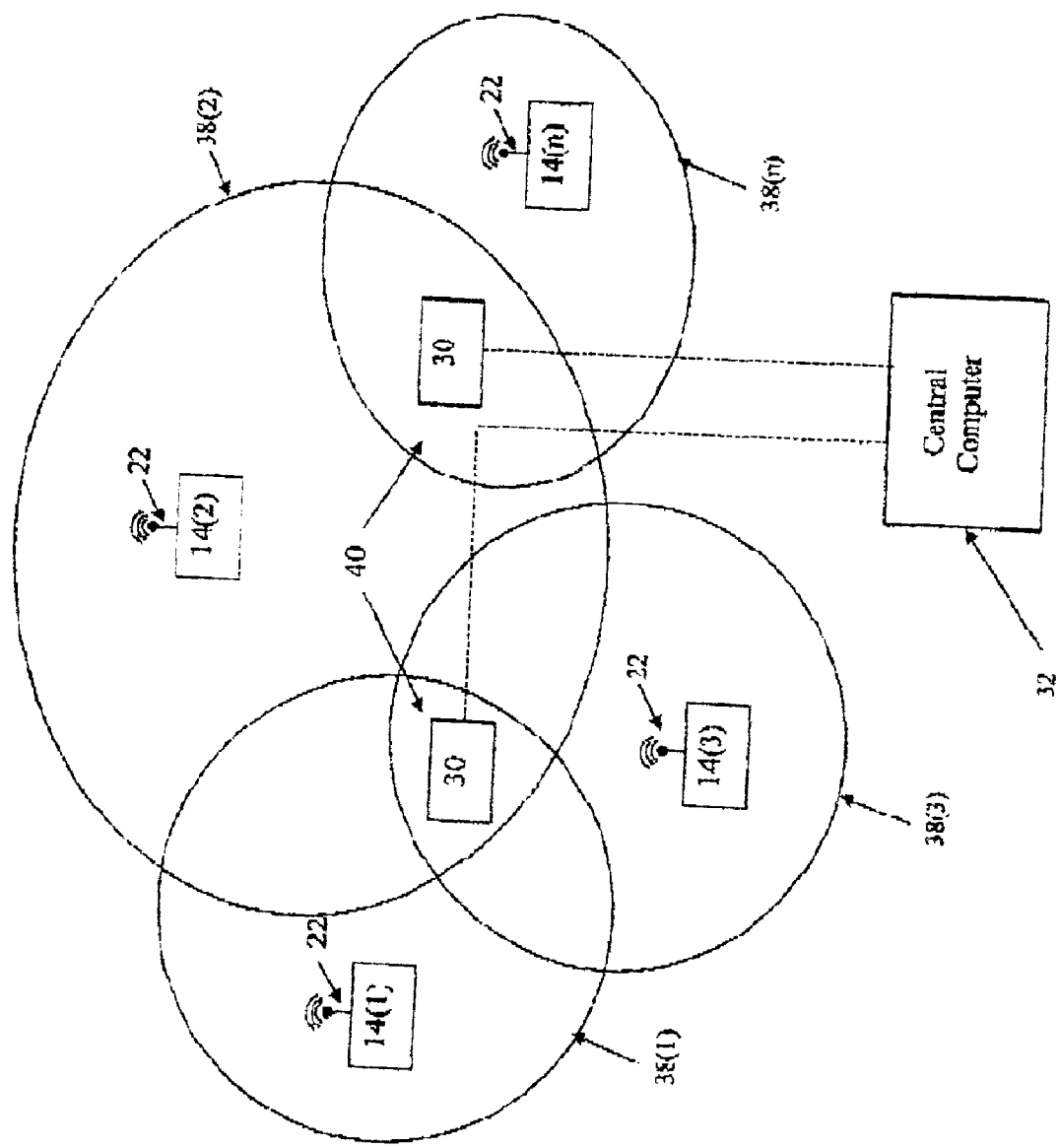
FIG. 9 illustrates a block diagram of the automatic meter reading module system of the present invention.
Figure 1:
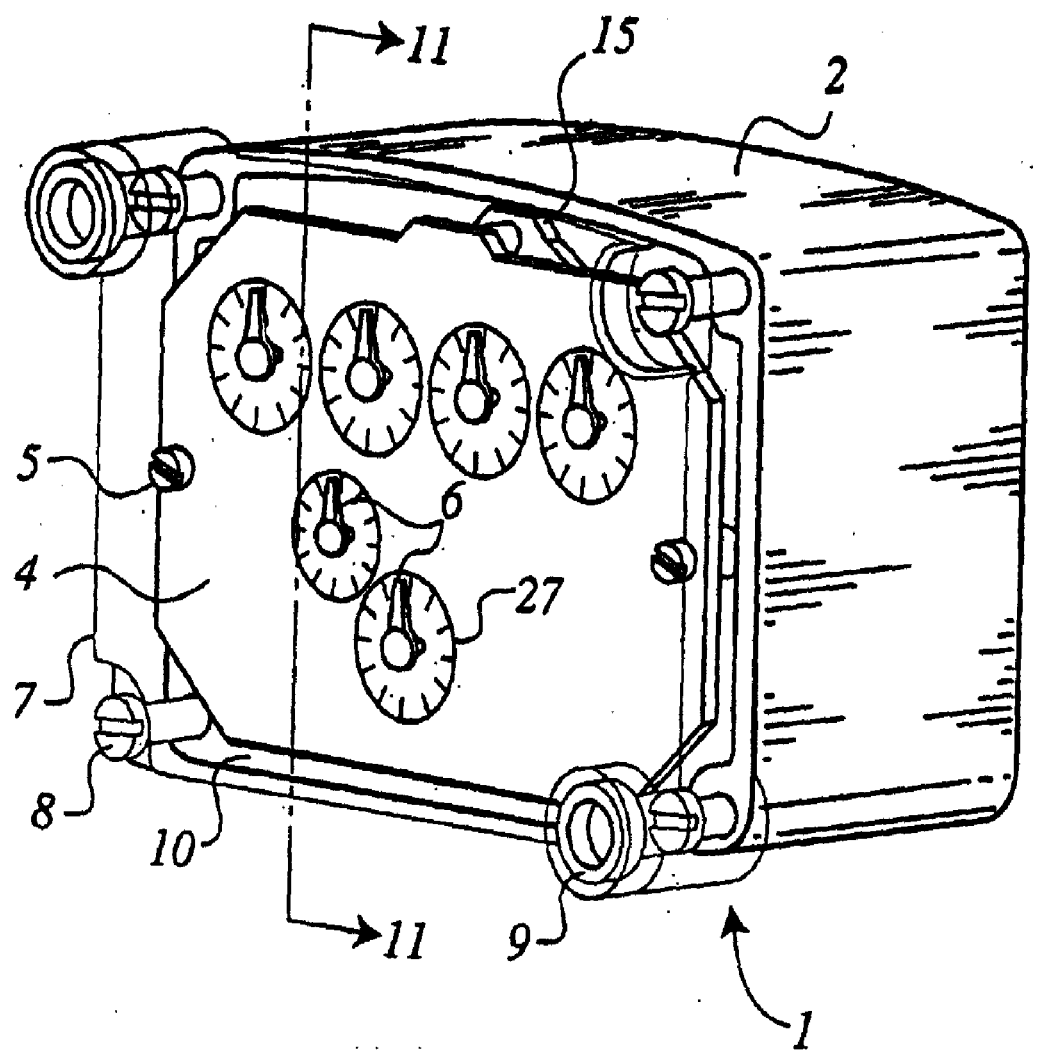
Figure 2:
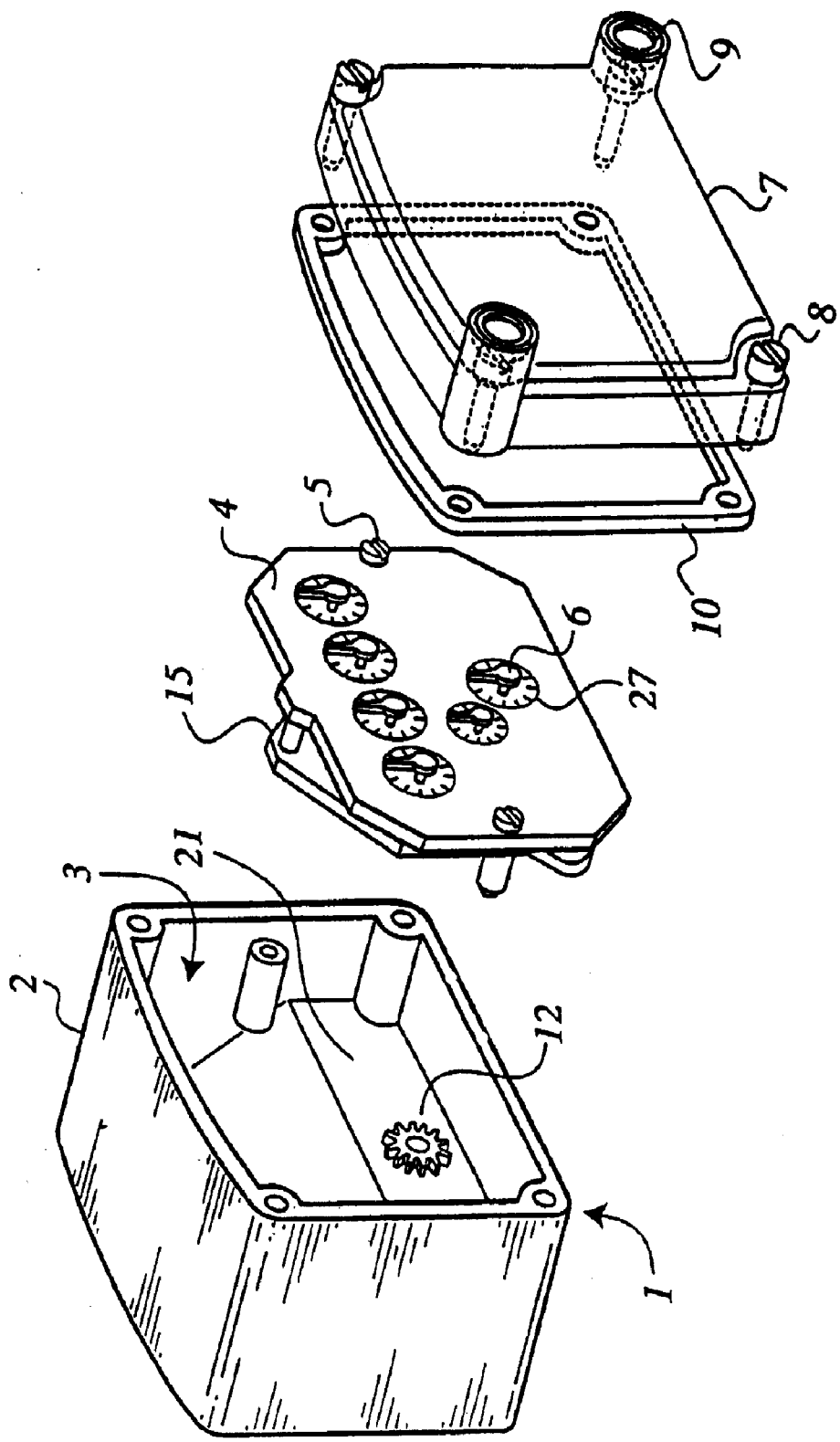
Figure 3:
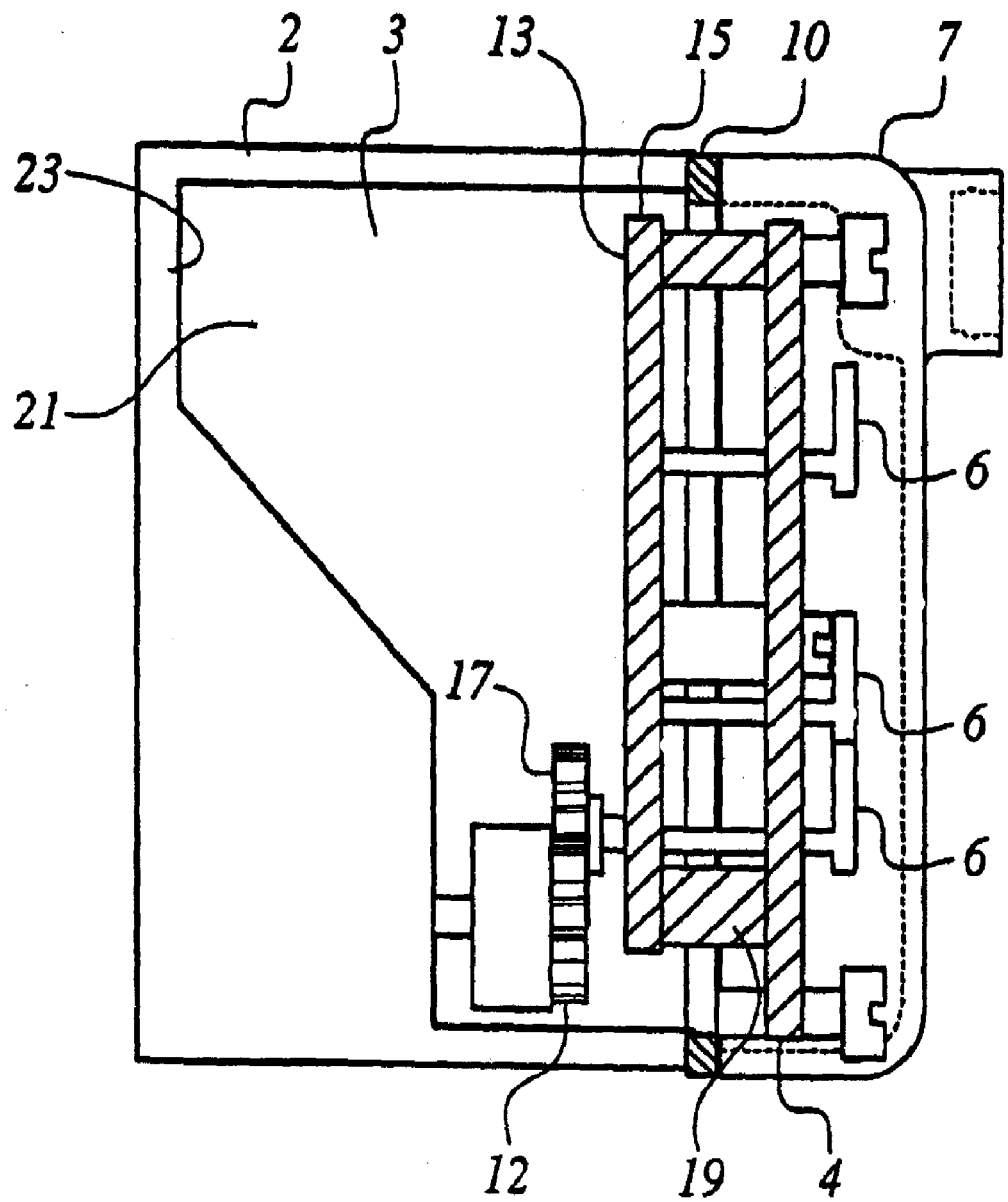
Figure 4:
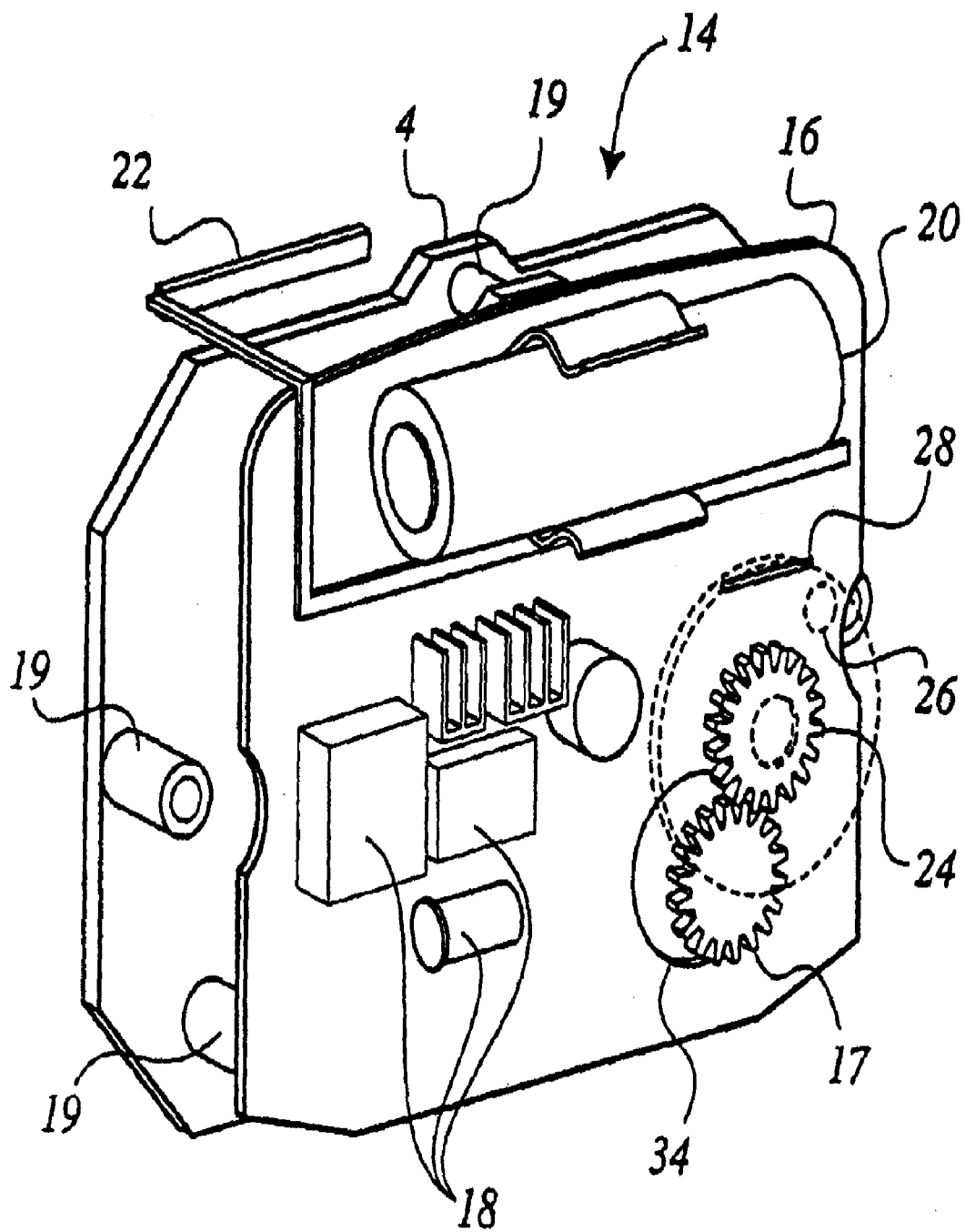
Figure 5:
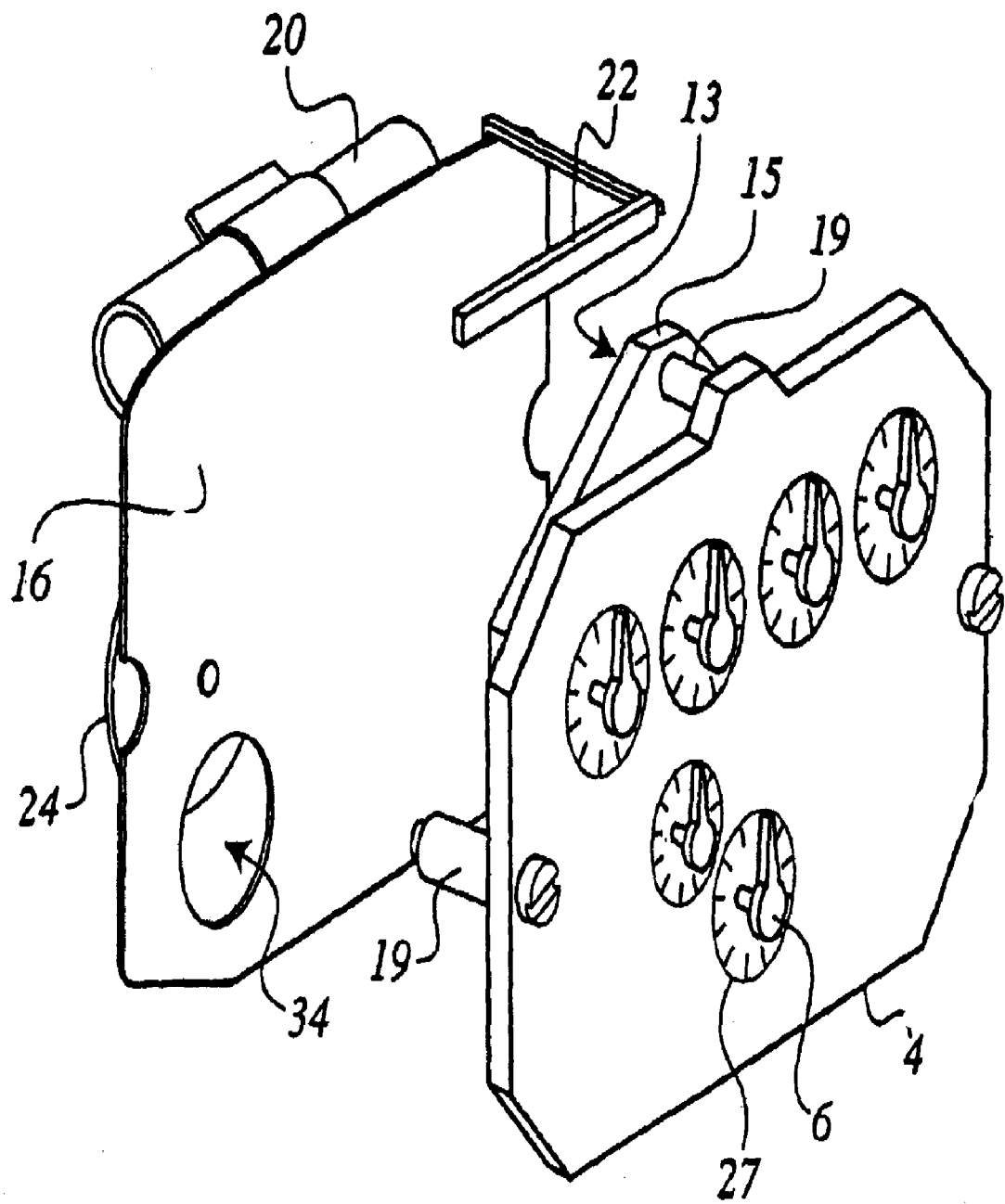
Figure 6:
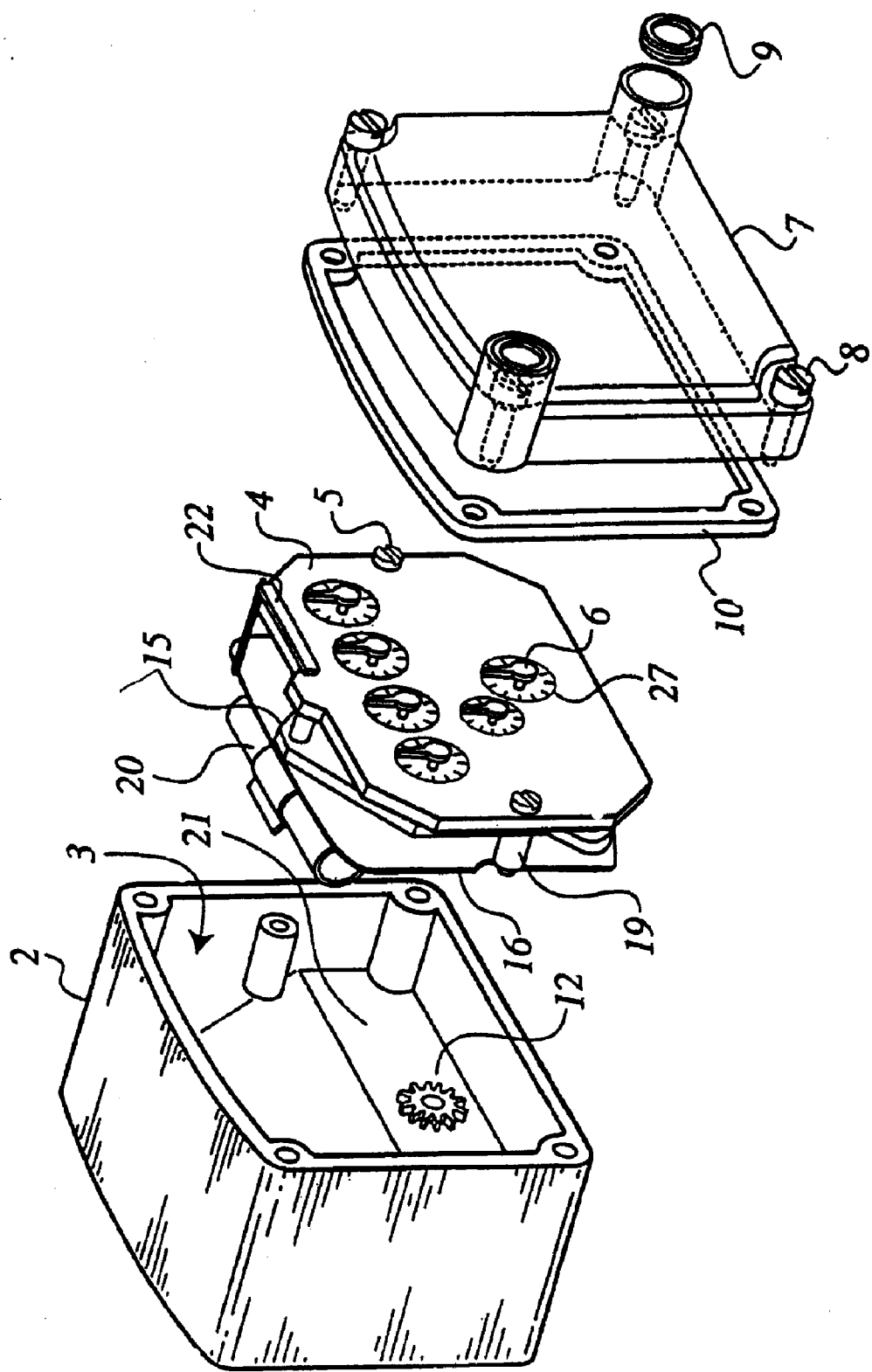
Figure 7:
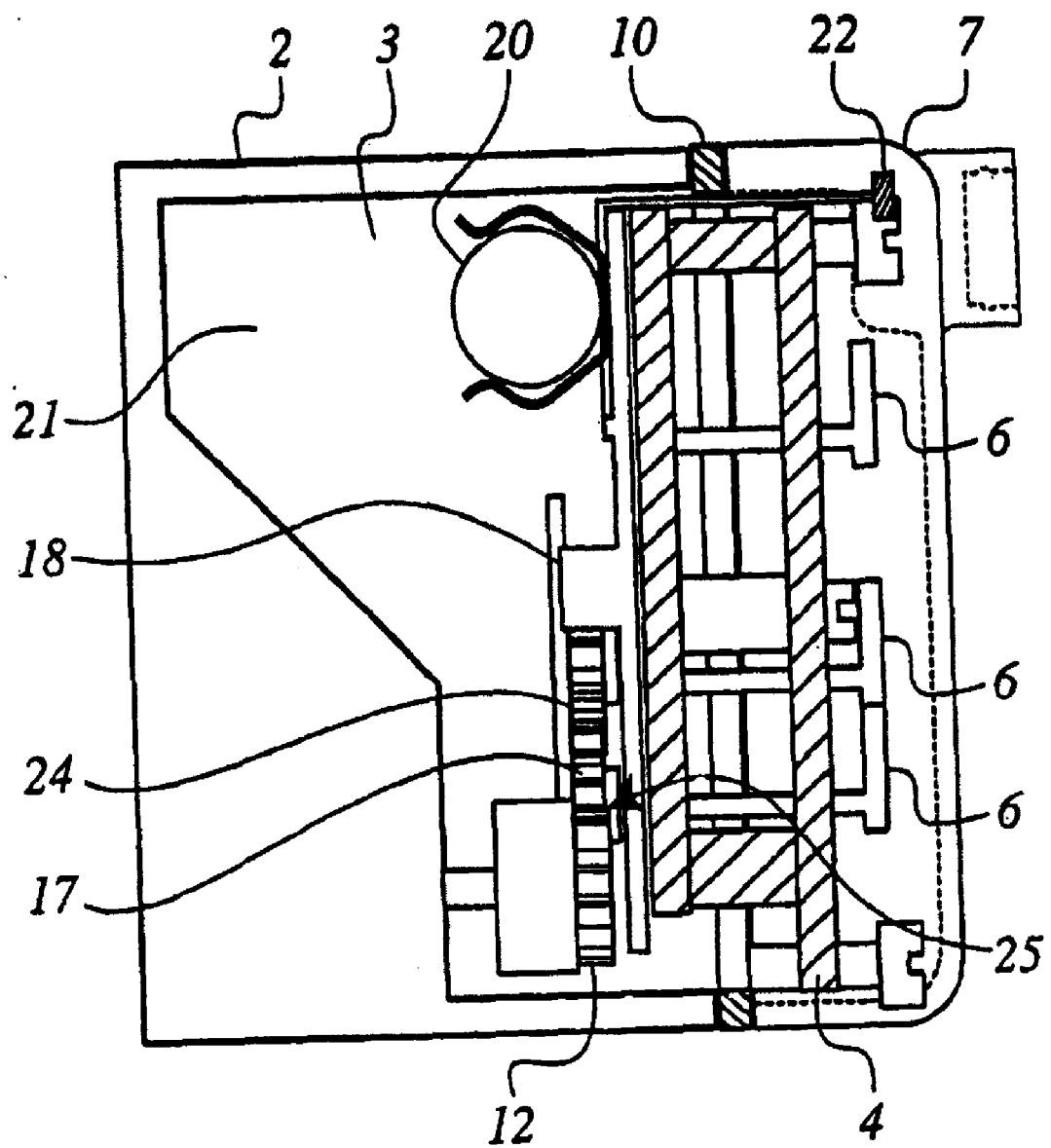
Figure 8:
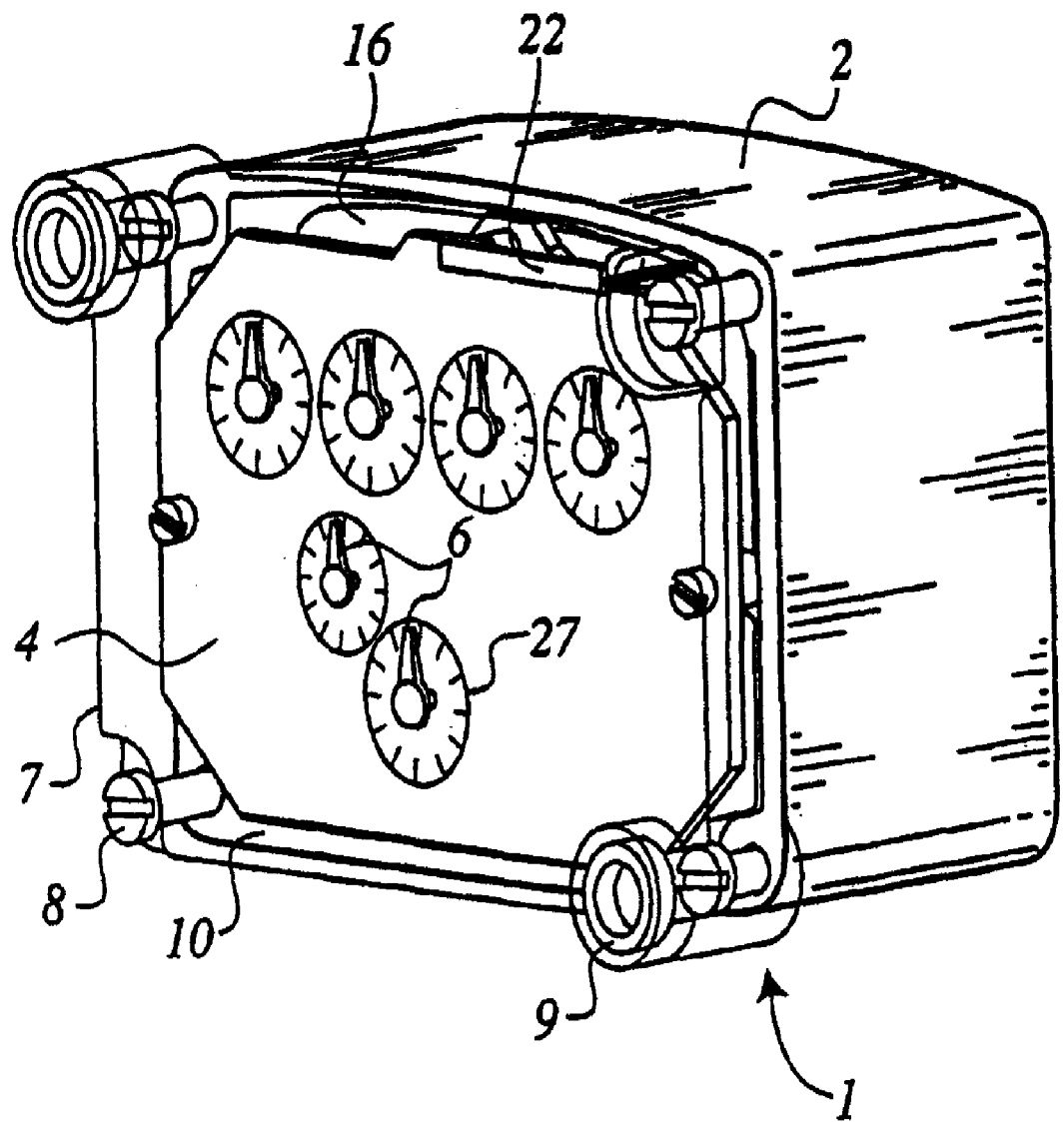
Figure 9:
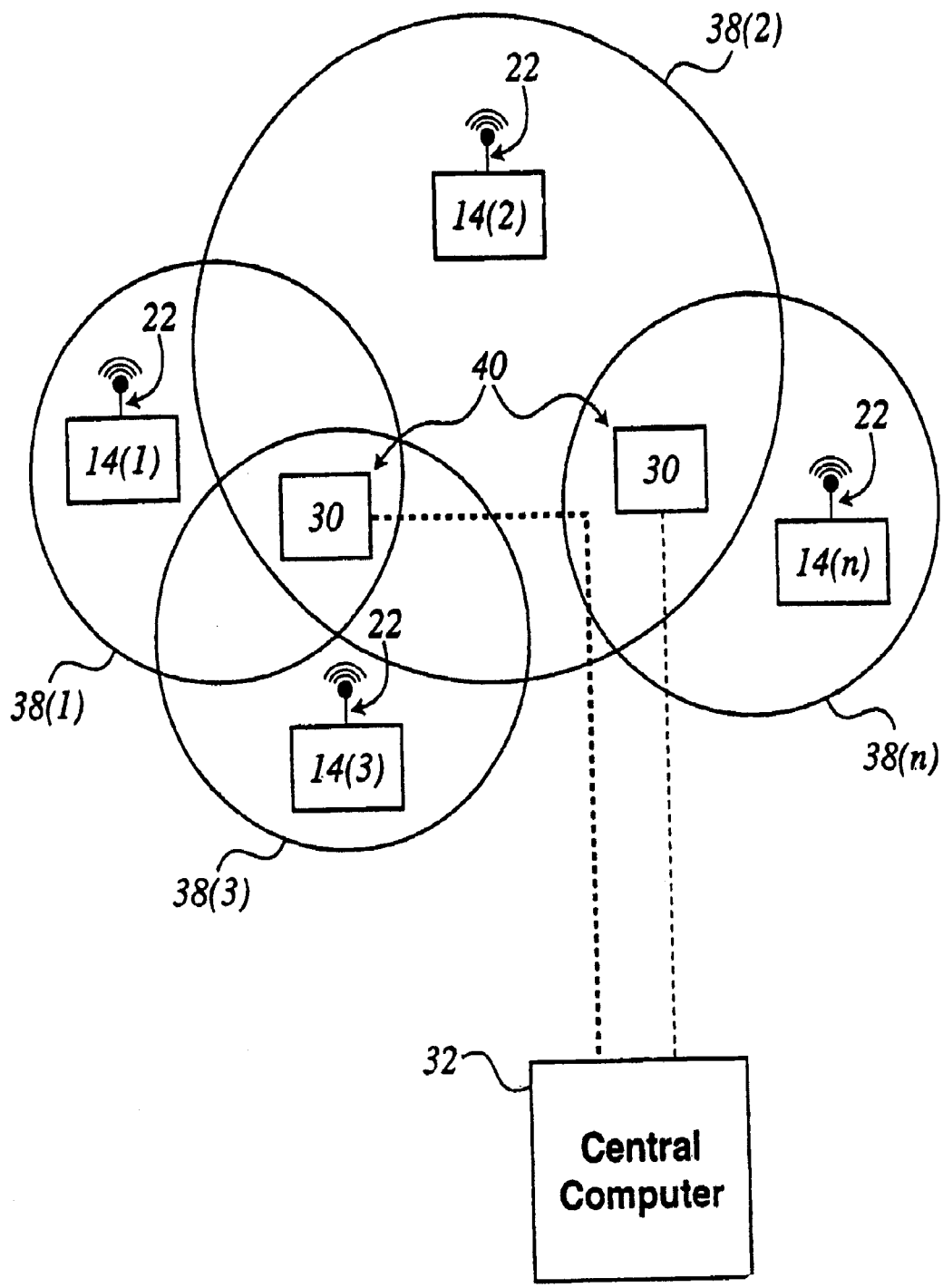

FIG. 9 illustrates a plurality of automatic reader modules, 14(1), 14(2), ... 14(n), (installed in respective meters 1) and their respective transmission footprints 38(1), 38(2), ... 38(n). When each module 14(n) is initially installed, the module installer specifies the time interval of the communication between the module 14 and the central data collection point 30. The following unique parameters can be programmed into and transmitted from the module 14(n): meter serial number, module ID, drive rate, unit of measure, etc. In this way, by having large transmission footprints 38(n) and unique transmission parameters, one central data collection point 30 collects utility consumption transmitted by a plurality of automatic reader modules 38(n). Advantageously, the central data collection point 30 may be located anywhere in the intersection 40 of the plurality of footprints 38(n). Multiple central data collection points 30 may be used creating redundancy. Further, multiple central data collection points 30 may be required when the plurality of footprints 38(n) do not intersect at one point, which is common. Once received by the central data collection point 30, the accumulated utility consumption and any other metering information sent by the plurality of modules 14(n) are processed further and sent to a central computer 32 where customer bills are generated.

Although the present invention has been described and illustrated in detail, it is to be clearly understood that the same is by way of illustration and example only and is not to be taken by way of limitation, the scope of the present invention being limited only by the terms of the appended claims.

What is claimed is:

1. An automatic meter reader module for a utility meter having an inner cavity of a given volume, comprising:
   a printed circuit board (PCB) on which is mounted on-board circuitry and detection equipment configured to detect utility consumption metered by the utility meter; and
   a transmission device operatively coupled to the PCB, the transmission device being configured to transmit data indicative of utility consumption;
   wherein the PCB is configured for mounting to a back side of a mechanical index assembly within the inner cavity of the utility meter without increasing the given volume of the inner cavity.

2. The automatic meter reader module of claim 1, wherein the PCB further comprises an opening adapted to receive a drive shaft extending between the mechanical index assembly and the utility meter.

3. The automatic meter reader module of claim 2, wherein the detection equipment comprises a pulse gear mounted for rotation on the circuit board and the on-board circuitry comprises a pulse detection circuit configured to detect rotations of the pulse gear.

4. The automatic meter reader module of claim 3, wherein the pulse gear is adapted to engage with and be driven by the drive shaft.

5. The automatic meter reader module of claim 3, further comprising a magnet positioned on the pulse gear, wherein the pulse detection circuit includes a reed switch positioned to detect rotations of the magnet via the pulse gear.

6. The automatic meter reader module of claim 1, wherein the transmission device includes an antenna extending from the PCB and positionable proximate the front of a mechanical index assembly.

7. The automatic meter reader module of claim 6, wherein the antenna is configured to transmit a signal at wide angles.

8. A utility meter comprising:
   a meter housing;
   a mechanical index assembly configured to mount to the meter housing and to define an inner cavity of a given volume bounded by the meter housing and the mechanical index assembly;
   an automatic meter reader module configured to mount within the inner cavity without increasing the given volume, the module being operatively connected to the mechanical index assembly and configured to detect utility consumption, wherein the automatic meter reader module further comprises:
   a printed circuit board (PCB) on which is mounted on-board circuitry and detection equipment configured to detect the utility consumption metered by the utility meter, the PCB being mounted to a back side of the mechanical index assembly; and
   a transmission device operatively coupled to the PCB, the transmission device being configured to transmit data indicative of utility consumption.

9. The utility meter of claim 8 wherein the automatic meter reading module includes a gear operatively engaged with the drive gear.

10. The automatic meter reader module of claim 8, wherein the PCB further comprises an opening adapted to receive a draft shaft extending between the mechanical index assembly and the utility meter.

11. The automatic meter reader module of claim 8, wherein the detection equipment comprises a pulse gear mounted for rotation on the PCB and the on-board circuitry comprises a pulse detection circuit configured to detect rotations of the pulse gear.

12. The automatic meter reader module of claim 11, wherein the pulse gear is adapted to engage with and be driven by the drive shaft.

13. The automatic meter reader module of claim 11, further comprising a magnet positioned on the pulse gear, wherein the pulse detection circuit includes a reed switch positioned to detect rotations of the magnet via the pulse gear.

14. The automatic meter reader module of claim 8, wherein the transmission device includes an antenna extending from the PCB and positioned approximate the front of a mechanical index assembly.

15. The automatic meter reader module of claim 8, wherein the antenna is contained within the confines of the utility meter.

16. The automatic meter reader module of claim 8, wherein the antenna is configured to transmit a signal at wide angles.

17. An automatic meter reader adapter module for use with a utility meter having a mechanical index assembly positioned within a inner cavity of a given volume, comprising:
- a printed circuit board (PCB) on which is mounted on-board circuitry and detection equipment configured to detect utility consumption metered by the utility meter; and
- a transmission device operatively couple to the PCB, the transmission device being configured to transmit data indicative of utility consumption, the transmission device including an antenna extending from the PCB;
- wherein the automatic meter reader module including the PCB and the transmission device is configured to mount within the inner cavity of the utility meter without requiring an increase in the given volume of the inner cavity and wherein the detection equipment includes a pulse gear mounted for rotation on the PCB and the on-board circuitry includes a pulse detection circuit configured to detect rotations of the pulse gear.

18. The automatic meter reader module of claim 17, further comprising a magnet positioned on the pulse gear, wherein the pulse detection circuit includes a read switch positioned to detect rotations of the magnet via the pulse gear.

19. The automatic meter reader module of claim 17 wherein the PCB includes an opening adapted to receive a drive shaft extending between the mechanical index assembly and the utility meter.

* * * * *

UNITED STATES PATENT AND TRADEMARK OFFICE
CERTIFICATE OF CORRECTION

PATENT NO. : 6,982,651 B2
DATED : January 3, 2006
INVENTOR(S) : Jeffrey L. Fischer It is certified that error appears in the above-identified patent and that said Letters Patent is hereby corrected as shown below:

The Title page should be deleted, and substitute with the attached title page.

The drawing sheets consisting of figs. 1-9 should be deleted and substitute with the attached drawing sheets, consisting of figs. 1-9.

Signed and Sealed this

Thirtieth Day of May, 2006

JON W. DUDAS
*Director of the United States Patent and Trademark Office*

(12) United States Patent
Fischer

(10) Patent No.: US 6,982,651 B2
(45) Date of Patent: Jan. 3, 2006

(54) AUTOMATIC METER READING MODULE

(75) Inventor: Jeffrey L. Fischer, Dubois, PA (US)

(73) Assignee: M & FC Holding, LLC, Raleigh, NC (US)

( * ) Notice: Subject to any disclaimer, the term of this patent is extended or adjusted under 35 U.S.C. 154(b) by 569 days.

(21) Appl. No.: 10/136,403

(22) Filed: May 2, 2002

(65) Prior Publication Data
US 2002/0163442 A1 Nov. 7, 2002

Related U.S. Application Data
(60) Provisional application No. 60/288,056, filed on May 2, 2001.

(51) Int. Cl.
G08B 23/00 (2006.01)

(52) U.S. Cl. .................. 340/870.02; 340/870.03; 340/870.32; 324/142

(58) Field of Classification Search ........... 340/870.02, 340/870.03, 870.32; 324/142
See application file for complete search history.

(56) References Cited
U.S. PATENT DOCUMENTS

| 4,614,945 | A | * | 9/1986 | Brunius et al. | 340/870.03 |
| 4,638,314 | A | | 1/1987 | Keller | |
| 4,642,634 | A | * | 2/1987 | Gerri et al. | 340/870.02 |
| 4,660,035 | A | * | 4/1987 | Hoffman | 340/870.02 |
| 4,688,038 | A | * | 8/1987 | Giammarese | 340/870.02 |
| 4,728,950 | A | * | 3/1988 | Hendrickson et al. | 340/870.31 |
| 4,904,995 | A | * | 2/1990 | Bonner et al. | 340/870.02 |
| 4,998,102 | A | * | 3/1991 | Wyler et al. | 340/870.02 |
| 5,014,213 | A | * | 5/1991 | Edwards et al. | 702/62 |
| 5,880,464 | A | * | 3/1999 | Vrionis | 250/230 |
| 5,963,650 | A | * | 10/1999 | Simionescu et al. | 705/63 |
| 6,100,816 | A | * | 8/2000 | Moore | 340/870.02 |
| 6,275,168 | B1 | * | 8/2001 | Slater et al. | 340/870.02 |
| 6,424,270 | B1 | * | 7/2002 | Ali | 340/870.02 |

* cited by examiner

*Primary Examiner*—Albert K. Wong
(74) *Attorney, Agent, or Firm*—Andrus, Sceales, Starke & Sawall, LLP

(57) ABSTRACT

An automatic meter reader module is provided that is adapted to be retrofitted or installed in a new or existing utility meter. The module includes a printed circuit board (PCB) on which is mounted on-board circuitry and detection equipment configured to detect utility consumption metered by the utility meter. A transmission device operatively coupled to the PCB is configured to transmit data indicative of utility usage. The PCB is configured to mount within an inner cavity of the utility meter.

9 Claims, 9 Drawing Sheets

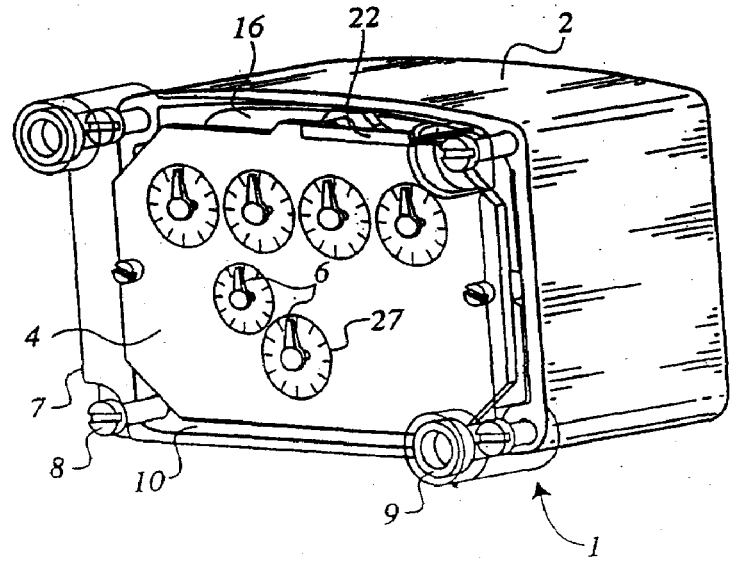

FIG. 8